No. 767,766. PATENTED AUG. 16, 1904.
J. H. ROSENTHAL.
SUPERHEATER.
APPLICATION FILED APR. 27, 1904.
NO MODEL. 8 SHEETS—SHEET 1.

No. 767,766. PATENTED AUG. 16, 1904.
J. H. ROSENTHAL.
SUPERHEATER.
APPLICATION FILED APR. 27, 1904.
NO MODEL. 8 SHEETS—SHEET 2.

No. 767,766. PATENTED AUG. 16, 1904.
J. H. ROSENTHAL.
SUPERHEATER.
APPLICATION FILED APR. 27, 1904.
NO MODEL. 8 SHEETS—SHEET 3.
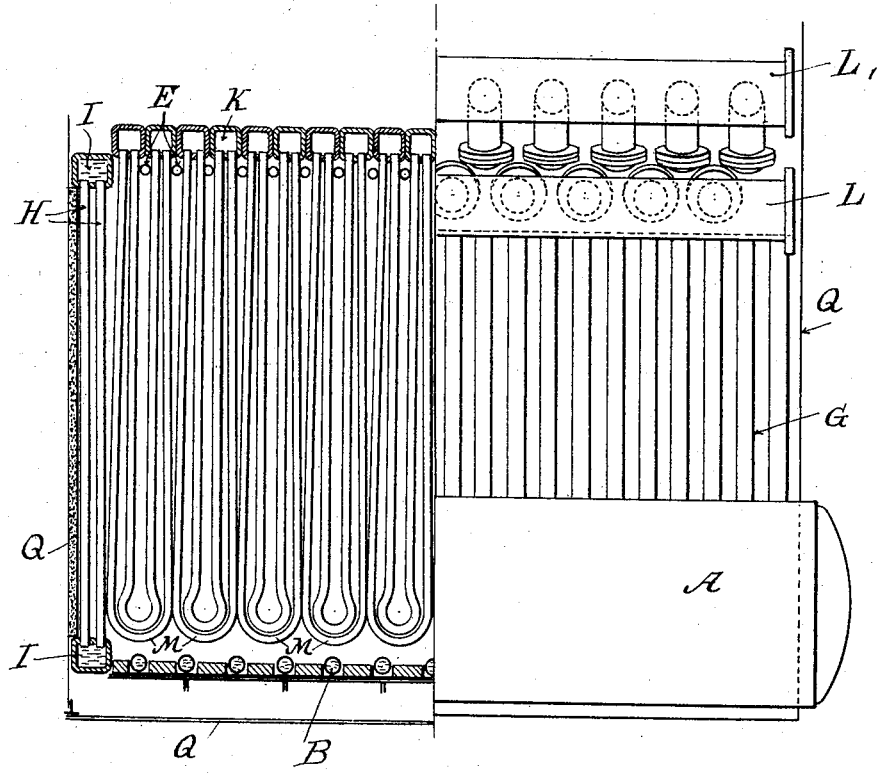

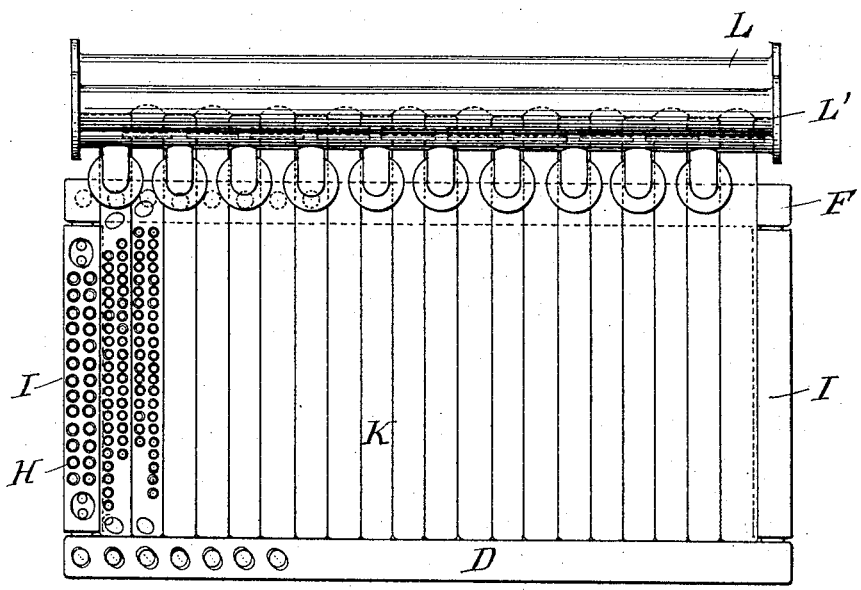

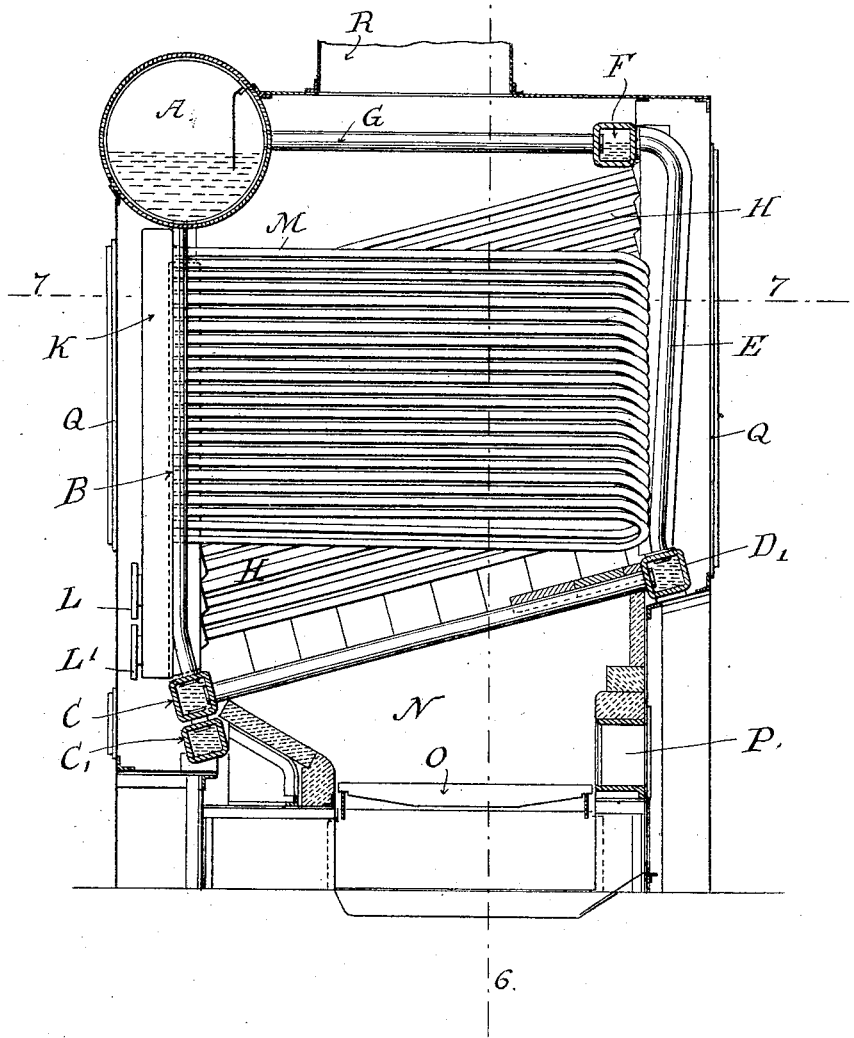

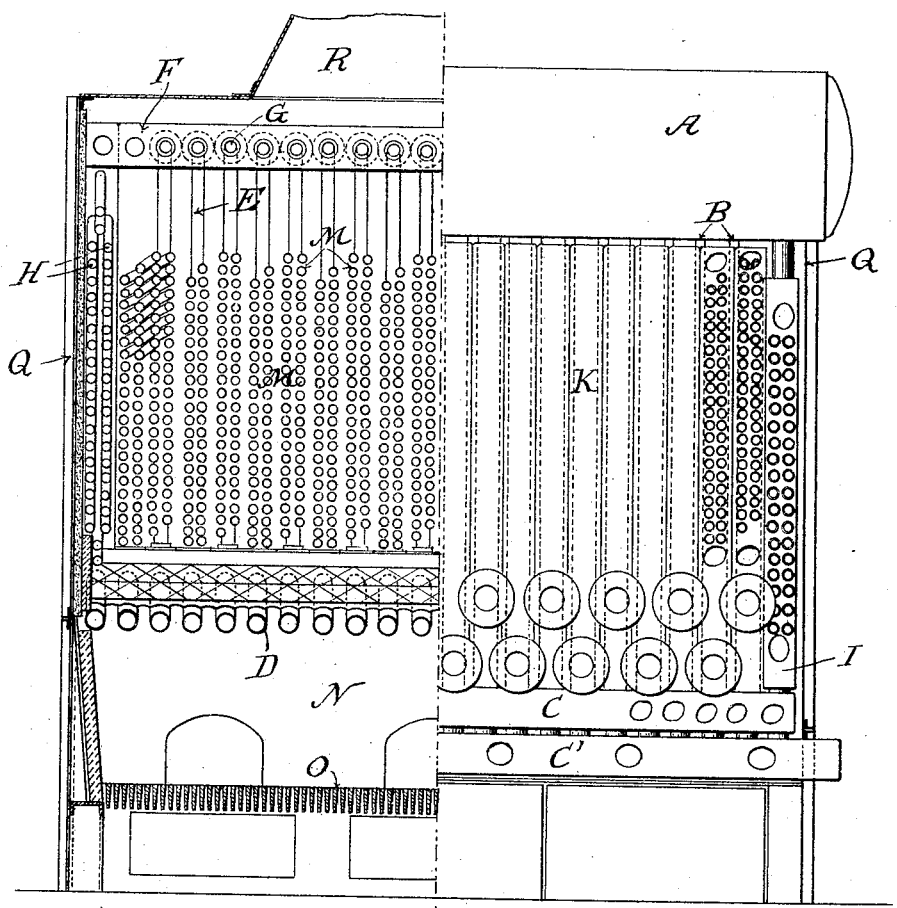

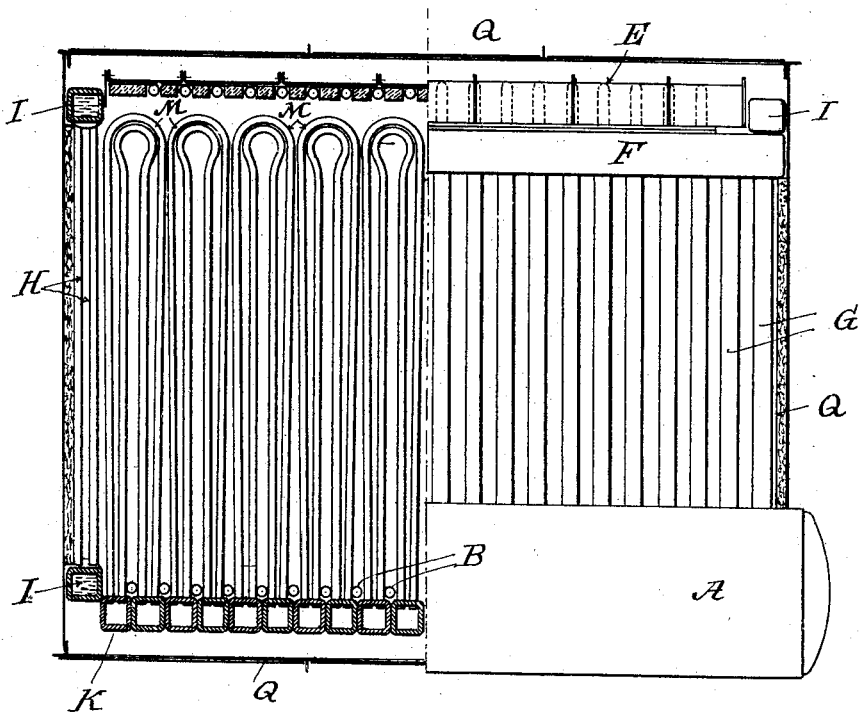

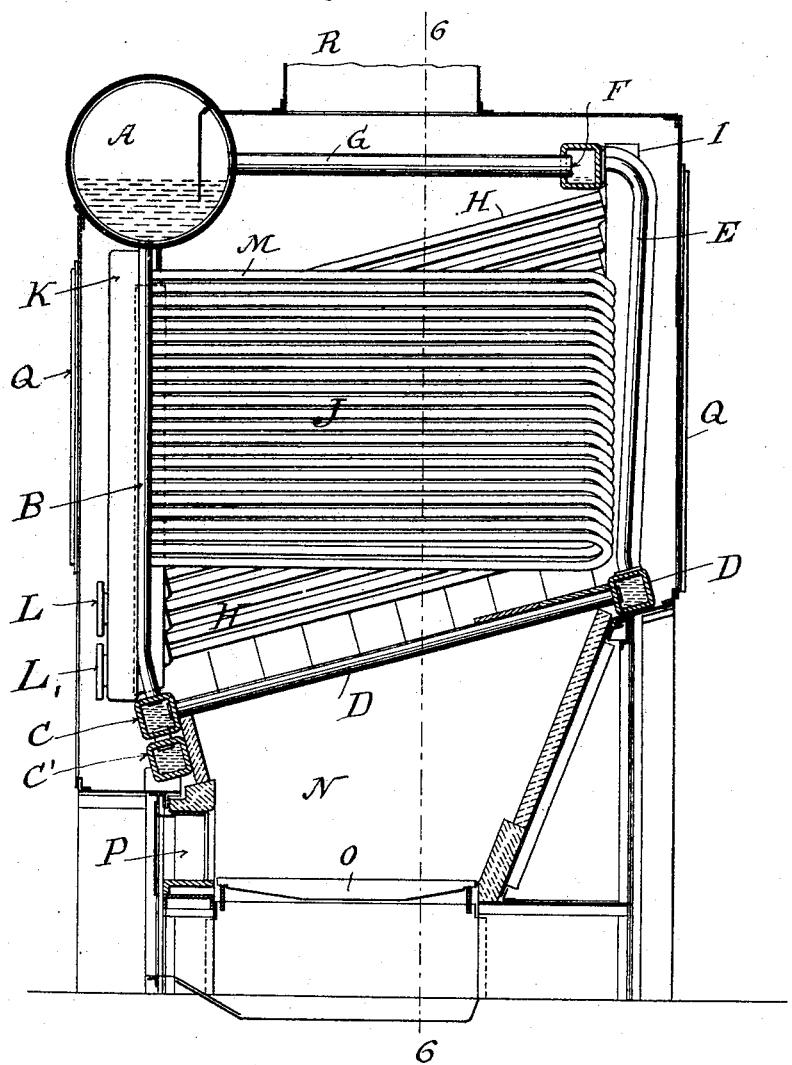

No. 767,766.

Patented August 16, 1904.

UNITED STATES PATENT OFFICE.

JAMES H. ROSENTHAL, OF LONDON, ENGLAND.

SUPERHEATER.

SPECIFICATION forming part of Letters Patent No. 767,766, dated August 16, 1904.

Application filed April 27, 1904. Serial No. 205,127. (No model.)

*To all whom it may concern:*

Be it known that I, JAMES H. ROSENTHAL, a subject of the King of Great Britain, residing at Oriel House, Farringdon street, London, England, have invented certain new and useful Improvements in Superheaters and Steam-Generators, of which the following is a specification, reference being had therein to the accompanying drawings.

This invention relates to superheaters and steam-generators for marine use and for other cases as mentioned below; and it has for its object to provide an independently-fired superheater combined in such wise with steam-generating elements (arranged, preferably, as in the well-known Babcock & Wilcox type of water-tube boiler) that the water-circulating and steam-generating water-tubes located over the furnace shall by absorption of part of the fiercest furnace-heat utilize such heat, while lowering the temperature of the gases which impinge on the tubes of the superheater, and the water-tubes at the ends or sides by presenting a heat-absorbing wall to the action of the fire-gases will enable a durable casing to be applied around the superheater without the extensive use of brickwork, which is impracticable in certain cases, such as on board ship.

The invention is illustrated, by way of example, in several modifications in the accompanying drawings, in which—

Figure 1:
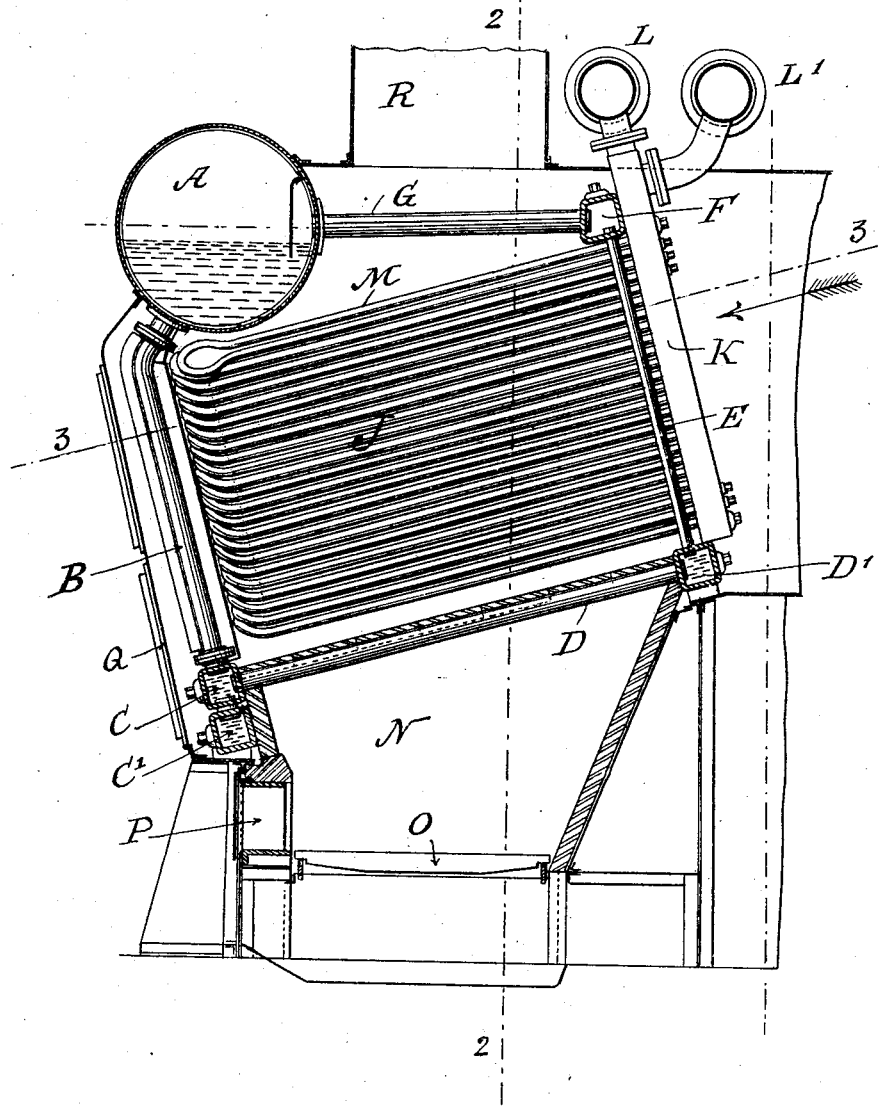
Figure 2:
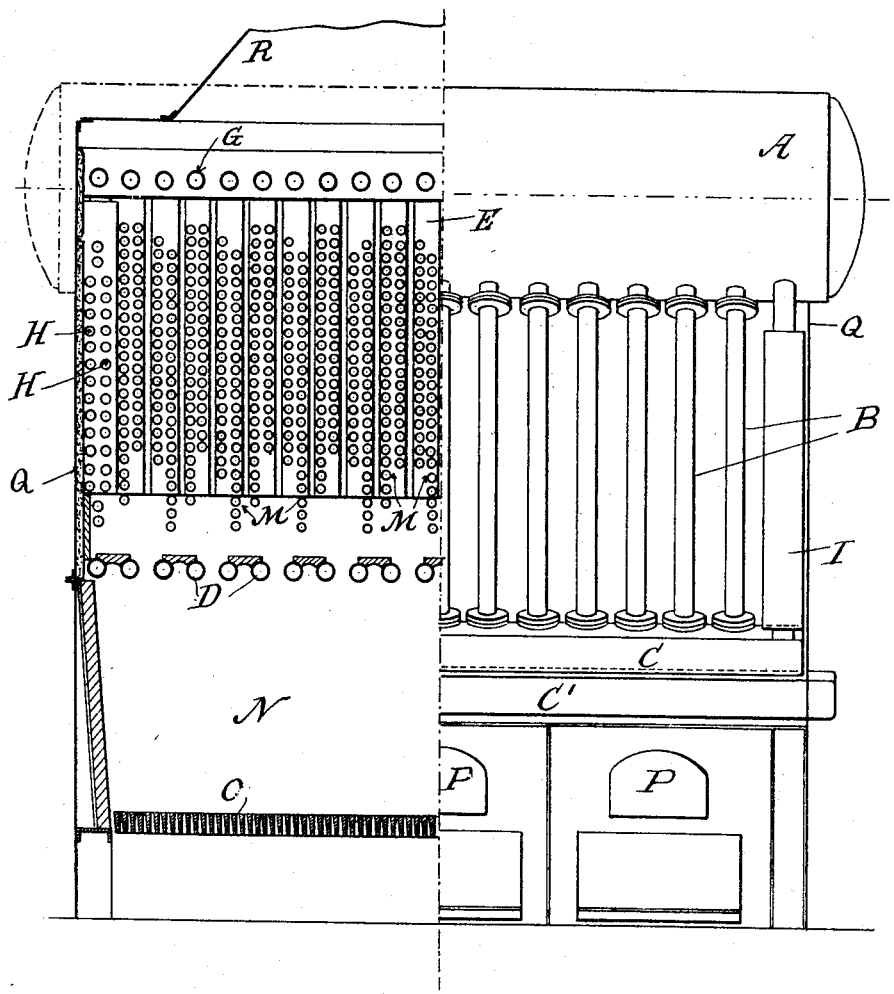

Figure 1 is a longitudinal section of one modification of the improved superheater. Fig. 2 shows the same partly in front elevation and partly in cross-section on the line 2 2 of Fig. 1. Fig. 3 shows the same partly in plan and partly in horizontal section at the line 3 3 of Fig. 1. Fig. 4 is an end elevation of the pressure parts only. Fig. 5 is a longitudinal section of a modified construction of the superheater. Fig. 6 shows the same partly in rear elevation and partly in cross-section at the line 6 6 of Fig. 5. Fig. 7 shows the same partly in plan and partly in horizontal section at the line 7 7 of Fig. 5. Fig. 8 is a longitudinal section of a further modification of the improved superheater.

As shown by the drawings, the combined water-circulating system and superheater comprises a skeleton boiler of the Babcock & Wilcox marine type, consisting of a steam and water drum A, downcomer-tubes B, which may be flanged and detachable, as shown, terminating in a cross-box or manifold or manifolds C C', inclined water-circulating tubes D, connecting the cross-box C to a cross-box D', into which are expanded approximately vertical uprising tubes E, connected to a cross-box F, from which horizontal tubes G discharge the uprising water and steam into the drum A. The sides of the skeleton boiler are also formed by inclined water-tubes H, extending between end headers I, into which they are expanded, these end headers being in turn nippled into the top and bottom cross-boxes D' and F at rear and in the cross-box C and drum A in front. The skeleton-boiler elements may, however, be constructed and connected in various other well-known ways, but in each case so as to inclose a large combustion-chamber J, within which the tubes of the superheater are placed.

The superheater is composed of a series of approximately vertical manifolds or boxes K, located at one end of the boiler, the manifolds being connected alternately to inlet-pipes L, into which is led from the various boilers supplying it the steam requiring to be superheated, and to outlet-pipes L' and having expanded into their inner walls a series of U-shape superheating-tubes M, one limb of each tube being connected to one manifold and the other limb to the adjoining manifold, as is common in superheater construction, though this arrangement may be varied. The superheating-tubes M protrude between the rear uprising water-tubes E in the case of Fig. 1 or between the downtake-tubes B in Figs. 5 and 8 into the combustion-chamber J, which they nearly fill. The combined superheater and boiler is inclosed in a casing Q, of metal.

The superheater and boiler elements are supported over a furnace-chamber N, fitted with a fire-grate O and firing-door P, adapted for firing with solid fuel; but the furnace may be fired by gaseous or liquid fuel. The furnace-gases pass up between the rows of water-tubes D and circulate around the superheater-tubes M and escape upward between the steam and water tubes G to an uptake or chimney R.

The fiercest heat of the furnace-gases is reduced by their impingement on the rows of tubes D, which absorb part of the heat, and the superheater-tubes M are thus subjected to the action of the gases at a lowered temperature, which increases their durability.

The surrounding of the superheater by walls composed of water-tubes, as herein provided for, permits of further absorption of heat for steam-generating purposes and enables a suitable iron casing to be used, which is especially advantageous in superheaters fitted on board ship and under other conditions where it is impracticable to employ thick brickwork walls.

The modification of the invention illustrated at Figs. 5, 6, and 7 differs from that hereinbefore described in respect of the arrangement of the superheater-manifolds in lines more truly vertical and the tubes attached thereto horizontal. The boiler elements are correspondingly arranged, and the firing-door of the furnace is placed under the higher end of the inclined water-tubes.

The modification shown at Fig. 8 resembles that shown at Figs. 5, 6, and 7, excepting that the furnace is arranged, as in Fig. 1, for firing from under the water-drum end.

Having now particularly described and ascertained the nature of my said invention and in what manner the same is to be performed, I declare that what I claim is—

1. A steam-superheater, comprising a firing chamber or furnace; a combustion space or chamber; a group of inclined steam-superheating tubes located in said combustion-space and communicating with a steam supply and exit; a series of water-circulating tubes located between the furnace-chamber and the superheater, and a series of connected water-circulation tubes inclosing said group of steam-superheating tubes communicating with an elevated steam and water drum.

2. A steam-superheater, comprising a firing chamber or furnace; a combustion-space above said furnace; a group of inclined steam-superheating tubes located in said combustion-space and communicating with a steam supply and exit in combination with a series of water-circulating tubes inclosing said group of steam-superheating tubes communicating with interposed manifolds or water-boxes and an elevated steam and water drum.

3. A steam-superheater, comprising a firing chamber or furnace; a combustion space or chamber; a group of steam-superheating tubes located in said combustion-space and communicating with a steam supply and exit; a series of inclined water-circulating tubes; a series of water-circulating tubes located between the furnace-chamber and the superheater; a series of connected water-circulation tubes inclosing said group of steam-superheating tubes, and communicating with an elevated steam and water drum.

4. A steam-superheater, comprising a firing chamber or furnace; a combustion-space above said furnace; a group of steam-superheating tubes located in said combustion-space and communicating with a steam supply and exit in combination with a series of water-circulating tubes located between the furnace-chamber and the superheater, and a series of water-circulating tubes inclosing said group of steam-superheating tubes communicating with interposed manifolds or water-boxes and an elevated steam and water drum.

5. A steam-superheater, comprising a firing chamber or furnace; a combustion-space above said furnace; a group of steam-superheating tubes located in said combustion-space and communicating with a steam supply and exit in combination with a series of water-circulating tubes located between the furnace-chamber and the superheater and communicating with an elevated steam and water drum.

6. A steam-superheater, comprising a firing chamber or furnace; a combustion space or chamber; a group of steam-superheating tubes located in said combustion-space and communicating with a steam supply and exit; a series of inclined water-circulating tubes located at the sides of the combustion-space; a series of water-circulating tubes located between the furnace-chamber and the superheater and a series of connected water-circulation tubes inclosing said group of steam-superheating tubes the respective series of water-circulating tubes communicating with an elevated steam and water drum.

In testimony whereof I affix my signature in presence of two witnesses.

JAMES H. ROSENTHAL.

Witnesses:
H. P. SMITH,
JAS. B. SIRETT.